US008447972B2

(12) United States Patent
Fukumizu (10) Patent No.: US 8,447,972 B2
(45) Date of Patent: May 21, 2013

(54) INFORMATION PROCESSING APPARATUS, INFORMATION PROCESSING METHOD, AND CONTROL PROGRAM

(75) Inventor: Makoto Fukumizu, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1178 days.

(21) Appl. No.: 11/448,213

(22) Filed: Jun. 7, 2006

(65) Prior Publication Data

US 2006/0294384 A1 Dec. 28, 2006

(30) Foreign Application Priority Data

Jun. 27, 2005 (JP) .................................. 2005-186577

(51) Int. Cl.
*H04L 29/06* (2006.01)
(52) U.S. Cl.
USPC ......................................................... 713/158
(58) Field of Classification Search
USPC ..... 713/185, 175, 176, 156; 709/206; 726/33, 726/27, 4
See application file for complete search history.

(56) References Cited

U.S. PATENT DOCUMENTS

| 6,615,347 | B1 * | 9/2003 | de Silva et al. | 713/156 |
| 7,366,906 | B2 * | 4/2008 | Enokida | 713/175 |
| 2002/0069361 | A1 * | 6/2002 | Watanabe et al. | 713/185 |
| 2003/0105963 | A1 | 6/2003 | Slick | |
| 2005/0138388 | A1 * | 6/2005 | Paganetti et al. | 713/185 |

FOREIGN PATENT DOCUMENTS

| JP | 2000-163329 A | 6/2000 |
| JP | 2000-347952 A | 12/2000 |
| JP | 2002-207616 A | 7/2002 |
| JP | 2002-215826 A | 8/2002 |
| JP | 2003-224561 A | 8/2003 |
| JP | 2004-532590 T | 10/2004 |

* cited by examiner

*Primary Examiner* — Brandon Hoffman
(74) *Attorney, Agent, or Firm* — Canon USA Inc IP Division (57) ABSTRACT

An information processing apparatus storing information having an expiration date. If the expiration date of the stored information has passed, the information processing apparatus obtains new information having a different expiration date and updates the stored information with the newly obtained information. In addition, the information processing apparatus transmits the newly obtained information having the different expiration date to another information processing apparatus.

14 Claims, 6 Drawing Sheets

INFORMATION PROCESSING APPARATUS, INFORMATION PROCESSING METHOD, AND CONTROL PROGRAM

BACKGROUND OF THE INVENTION

1. Field of the Invention

The present invention relates to an information processing apparatus capable of updating information having an expiration date, an information processing method for the same, and a control program for the same.

2. Description of the Related Art

Electronic certificates are used for encryption in communications, for enhancing data authenticity, and in authentication of a communicating party.

For example, a certificate authority signs a public key of a printer by using its own private key, thereby certifying that the owner of the public key is the printer. In a case where a user uses the printer, an information processing apparatus used by the user verifies the authenticity of the printer public key by using a certificate from the certificate authority. This enables the information processing apparatus to encrypt print data by using an authorized printer public key. Such technology is disclosed in Japanese Patent Laid-Open No. 2003-224561 (corresponding to U.S. Patent Application Publication No. 2003-105963).

In some cases, an expiration date is set in a certificate of a certificate authority in order to maintain certificate integrity. In such cases, an information processing apparatus obtains a new certificate from the certificate authority when the information processing apparatus finds that the expiration date of the certificate has passed and thereafter uses the new certificate. In the case that a plurality of information processing apparatuses use the same certificate from the same certificate authority, the information processing apparatuses obtain a new certificate from the certificate authority on an individual basis when each of the plurality of information processing apparatuses finds that the expiration date of the certificate has passed.

However, in the case that the plurality of information processing apparatuses use the same certificate, it is desired that, when at least one of the plurality of information processing apparatuses finds that the certificate has expired, the certificate held in each of the plurality of information processing apparatuses be updated. In this case, the certificate held in an information processing apparatus in the plurality of information processing apparatuses may be updated before the information processing apparatus finds that the certificate has expired. This allows the information processing apparatus to, when trying to perform communication using a certificate, start using the certificate without having to update the certificate.

SUMMARY OF THE INVENTION

The present invention provides an information processing apparatus and an information processing method thereof allowing updating of information having an expiration date, such as a certificate, in each of a plurality of information processing apparatuses at an early time.

According to one aspect of the present invention, an information processing apparatus includes a storing unit configured to store first information having a first expiration date, an obtaining unit configured to obtain second information having a second expiration date in a case where the first expiration date of the first information stored in the storing unit has passed, an updating unit configured to update the first information stored in the storing unit with the second information obtained by the obtaining unit, and a transmitting unit configured to transmit the second information having the second expiration date obtained by the obtaining unit to a second information processing apparatus.

According to another aspect of the present invention, an information processing method for updating first information having a first expiration date in a plurality of information processing apparatuses including first and second information processing apparatuses is provided. The information processing method includes an obtaining step of obtaining second information having a second expiration date in a case where the first expiration date of the first information stored in the first information processing apparatus has passed, a first updating step of, in the first information processing apparatus, updating the first information stored in the first information processing apparatus with the second information date obtained in the obtaining step, a transferring step of transferring the second information having the second expiration date obtained in the obtaining step from the first information processing apparatus to the second information processing apparatus, and a second updating step of, in the second information processing apparatus, updating the first information stored in the second information processing apparatus with the second information transferred in the transferring step.

According to yet another aspect of the present invention, a control program for controlling an information processing apparatus including a storing unit configured to store first information having a first expiration date is provided. The control program allows the information processing apparatus to execute an obtaining step of obtaining second information having a second expiration date in a case where the first expiration date of the first information stored in the storing unit has passed, an updating step of updating the first information stored in the storing unit with the second information obtained in the obtaining step, and a transmitting step of transmitting the second information obtained in the obtaining step to another information processing apparatus.

Further features of the present invention will become apparent from the following description of exemplary embodiments with reference to the attached drawings.

DESCRIPTION OF THE EMBODIMENTS

First Exemplary Embodiment

Figure 1:
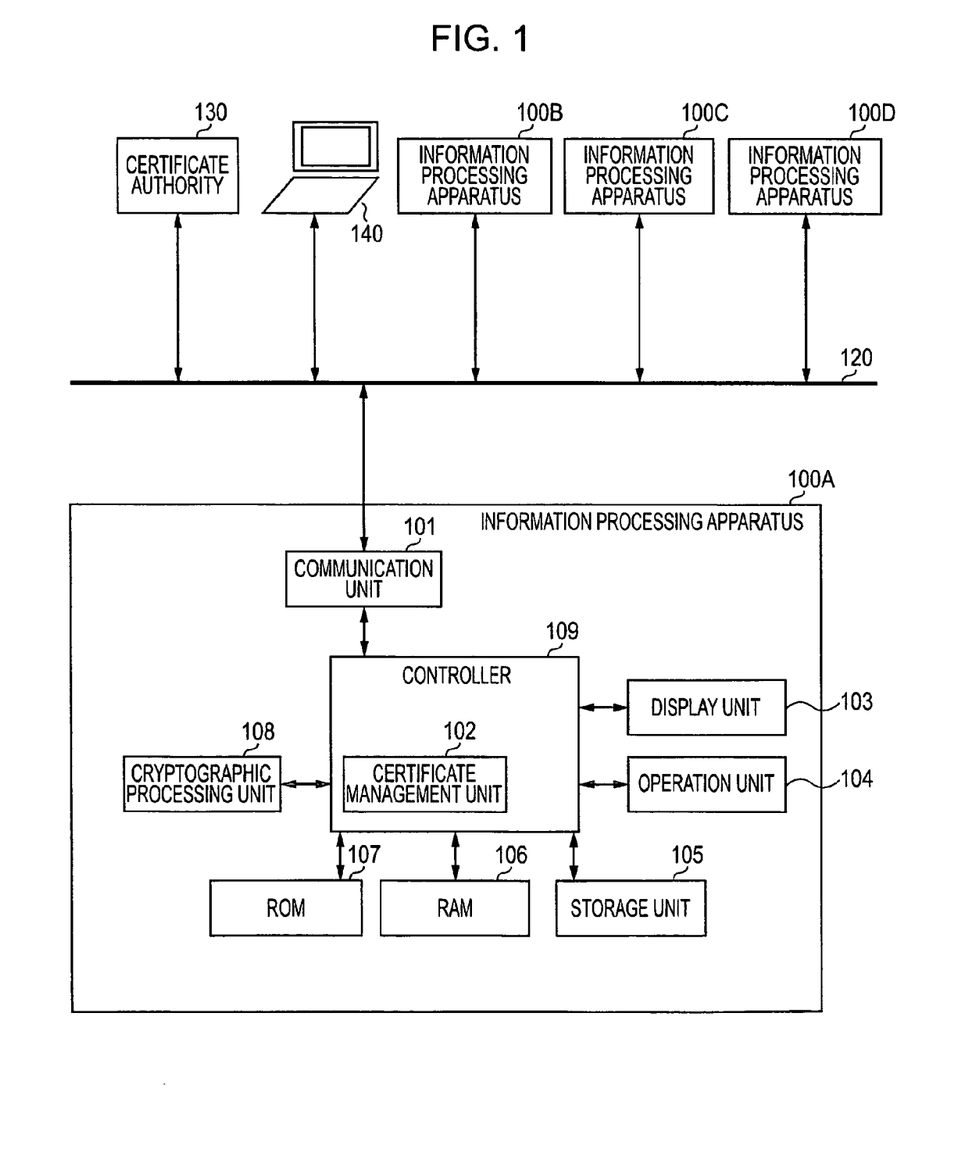
FIG. 1 is a block diagram showing the functional structure of a network system according to an exemplary embodiment of the present invention.

FIG. 1 is a block diagram showing the functional structure of a network system according to an exemplary embodiment.

In the network system, information processing apparatuses 100A, 100B, 100C, and 100D, a certificate authority 130, and an administrator's terminal 140 can communicate with one another via a network 120.

The information processing apparatus 100A includes a communication unit 101, a certificate management unit 102, a display unit 103, an operation unit 104, a storage unit 105, a random-access memory (RAM) 106, a read-only memory (ROM) 107, a cryptographic processing unit 108, and a controller 109.

The communication unit 101 functions as an interface and transmits and receives data to and from an external device via the network 120.

The display unit 103 displays various operation conditions of the information processing apparatus, operational instructions, the status of the information processing apparatus, and the like. The operation unit 104 inputs instructions, numerics, and characters as a user operates various keys. In a case where a touch panel is used, the touch panel functions as both the display unit 103 and the operation unit 104.

The storage unit 105 is a rewritable nonvolatile memory, for example, a hard disk. The storage unit 105 stores a certificate to be described below, and the like. The RAM 106 stores various programs transferred from the ROM 107 and various kinds of data transferred from the storage unit 105. The RAM 106 is also used as a work area for the controller 109. The ROM 107 stores various programs.

The cryptographic processing unit 108 encrypts data. The cryptographic processing unit 108 also functions to decrypt encrypted data.

The controller 109 is a central processing unit (CPU) and performs various kinds of control of the information processing apparatus and various kinds of signal processing in accordance with control programs. The certificate management unit 102 manages an electronic certificate (hereinafter referred to as certificate). The certificate management unit 102 is realized by the execution of a certificate management program in the control programs performed by the controller 109.

A typical example of the electronic certificate is a certificate authority (CA) certificate. The CA certificate is used for verifying the authenticity of a server certificate sent from an external server when the information processing apparatus communicates with the external server. For example, the certificate is used to verify the authenticity of a server certificate received from a communicating party in secure sockets layer (SSL) encrypted communication.

The information processing apparatuses 100B to 100D have the same functional structure as that of the information processing apparatus 100A. Hereinafter, the controller in the information processing apparatus 100A is referred to as a controller 109A, that in the information processing apparatus 100B is referred to as a controller 109B, that in the information processing apparatus 100C is referred to as a controller 109C, and that in the information processing apparatus 100D is referred to as a controller 109D. The communication unit, the certificate management unit, the display unit, the operation unit, the storage unit, the RAM, the ROM, and the cryptographic processing unit are referred in the same manner.

Examples of each of the information processing apparatuses 100A to 100D include a printer, a copier, a facsimile machine, a multifunction peripheral, a personal computer, and a personal digital assistant.

The network 120 is typically a local-area network (LAN) or a wide area network (WAN). The network 120 may be a wired network, such as Ethernet®, or a wireless network, such as a wireless LAN. The certificate authority 130 is a server computer that issues the certificate. The administrator's terminal 140 is a computer used by a network administrator.

In the first exemplary embodiment, the information processing apparatus 100A has the capability of distributing the certificate, so that, when a certificate has expired, the information processing apparatus 100A obtains a new certificate and distributes the new certificate to each of the information processing apparatuses 100B to 100D.

Figure 2:
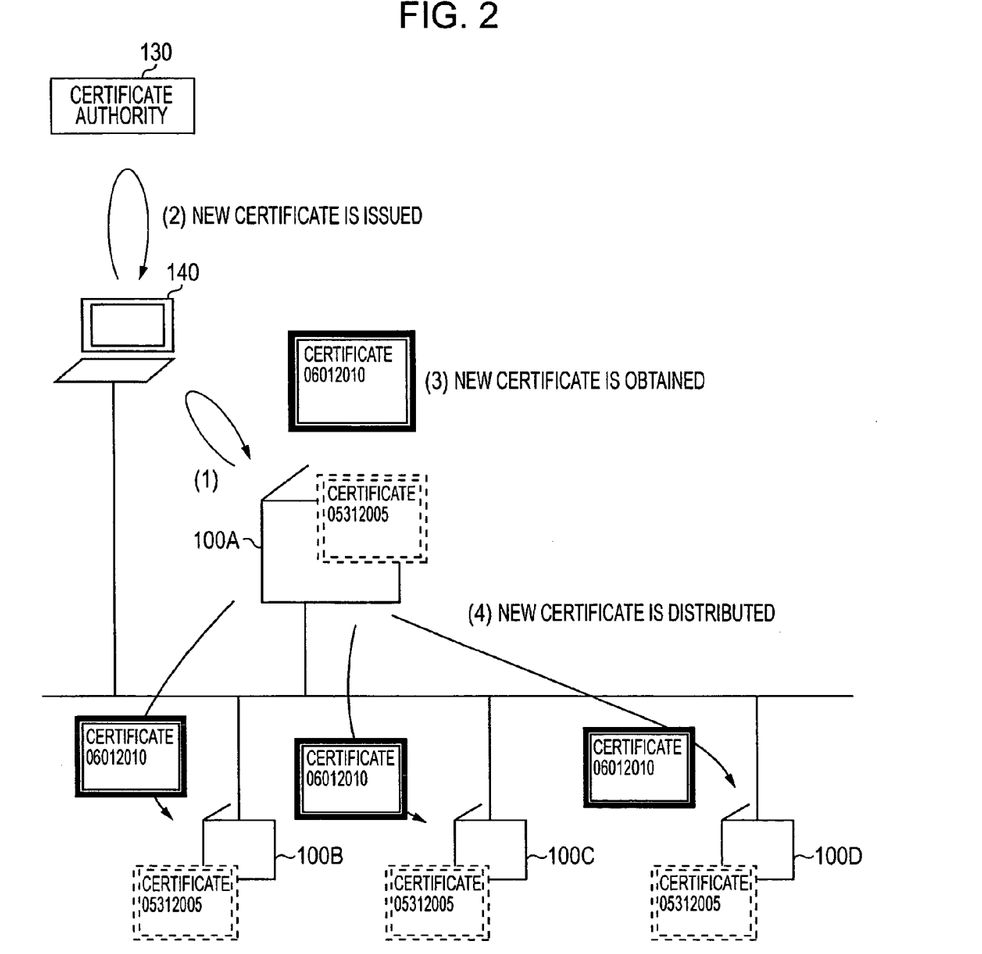
FIG. 2 illustrates an information processing process performed in a case where a first information processing apparatus in a plurality of information processing apparatuses finds that the expiration date of a certificate has passed when using the certificate.

With reference to FIG. 2, an information processing process performed in a case where the information processing apparatus 100A finds that the expiration date of a certificate has passed when using the certificate is described.

When the information processing apparatus 100A finds that a certificate that is currently held therein has expired (the expiration date: May 31, 2005), the information processing apparatus 100A notifies the administrator's terminal 140 that the expiration date of the certificate has passed. Together with this notification, the information processing apparatus 100A transmits a request to update the certificate to the administrator's terminal 140 ("(1)" in FIG. 2).

In response to the update request, the administrator's terminal 140 applies for the issuance of a new certificate to the certificate authority 130 and obtains the new certificate from the certificate authority 130 ((2)). In this case, a process of issuing the certificate is performed over the network 120. However, the process may be carried out via the administrator's hand. In such a case, the administrator's terminal 140 displays a message to request the administrator to obtain the new certificate in response to the update request, and the administrator obtains the new certificate from the certificate authority in accordance with the message, and inputs the new certificate to the administrator's terminal 140.

When the administrator's terminal 140 transmits the new certificate to the information processing apparatus 100A, the information processing apparatus 100A obtains the new certificate from the administrator's terminal 140 ((3)). The expiration date of the new certificate is Jun. 1, 2010. The information processing apparatus 100A stores the new certificate in the storage unit 105A in order to update the expired certificate (the expiration date: May 31, 2005) with the new certificate (the expiration date: Jun. 1, 2010).

The information processing apparatus 100A then distributes the obtained new certificate to each of the information processing apparatuses 100B to 100D ((4)). The information processing apparatuses 100B to 100D store the new certificate in the respective storage units in order to update the expired certificate (the expiration date: May 31, 2005) with the new certificate (the expiration date: Jun. 1, 2010).

Figure 3:
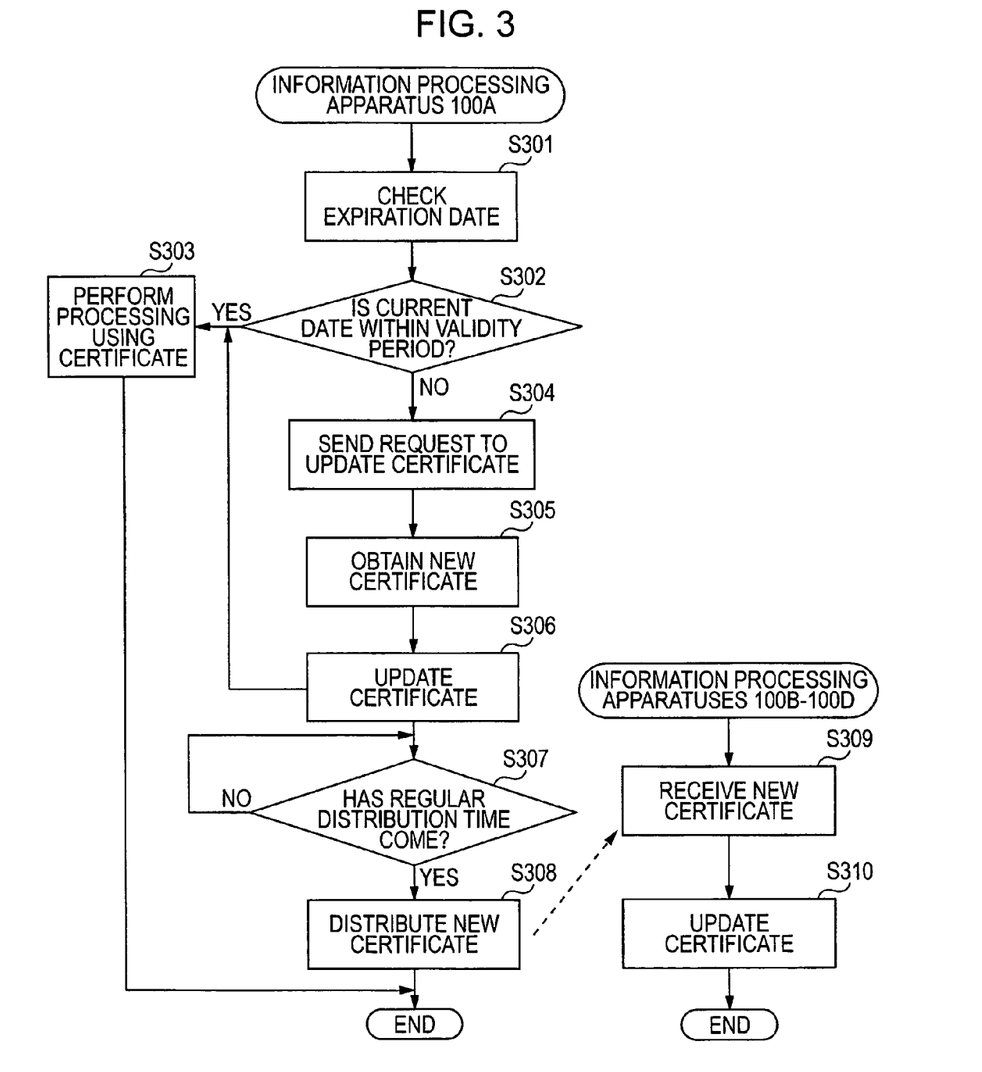
FIG. 3 is a flowchart of the information processing process performed by the information processing apparatuses shown in FIG. 2.

FIG. 3 is a flowchart of the information processing process performed by the information processing apparatuses shown in FIG. 2. The controller and the certificate management unit in each of the information processing apparatuses 100A to 100D perform the following processing in accordance with a control program based on the flowchart of FIG. 3.

When the information processing apparatus 100A tries to communicate with an external device using a certificate, the certificate management unit 102A checks the expiration date of the certificate (step S301). The certificate management unit 102A determines whether the current date is before the expiration date (whether the current date is within the validity period) (step S302). If the current date is before the expiration date (YES in step S302), the controller 109A performs processing using the certificate (step S303).

If the current date is not before the expiration date (No in step S302), the certificate management unit 102A transmits a request to update the certificate to the administrator's terminal 140 via the communication unit 101A (step S304). The update request contains a certificate ID for identifying the certificate and a certificate authority ID for identifying a certificate authority that is a publisher of the certificate. The administrator's terminal 140 or the administrator obtains a new certificate on the basis of the certificate ID and the certificate authority ID.

When the new certificate is transmitted from the administrator's terminal 140, the certificate management unit 102A obtains the new certificate (step S305). The certificate management unit 102A stores the new certificate in the storage unit 105A in order to update the expired certificate stored in the storage unit 105A with the new certificate (step S306).

The controller 109A then performs processing using the new certificate (step S303). In parallel with this processing, the certificate management unit 102A determines whether the time the controller 109A starts the distribution of device information to each of the information processing apparatuses 100B to 100D has come (step S307). The controller 109A distributes the device information (e.g., address book data in which email addresses, facsimile numbers, and other information are registered) to each of the information processing apparatuses 100B to 100D on a regular basis.

At the time the controller 109A starts distributing the device information, the certificate management unit 102A requests the controller 109A to distribute the new certificate together with the device information. The controller 109A transmits the new certificate together with the device information to each of the information processing apparatuses 100B to 100D via the communication unit 101A (step S308). Since the network addresses of the information processing apparatuses 100B to 100D are registered in the storage unit 105A by a user in advance, the information processing apparatus 100A distributes the new certificate to the registered network addresses.

In the process shown in the flowchart of FIG. 3, the distribution of the new certificate waits until the regular distribution starts. However, the new certificate may be transmitted to each of the information processing apparatuses 100B to 100D via the communication unit 101A immediately after the certificate management unit 102A obtains the new certificate.

In each of the information processing apparatuses 100B to 100D, the following processing is performed. The processing is described by taking the information processing apparatus 100B as an example. When the new certificate is transmitted from the information processing apparatus 100A, the certificate management unit 102B in the information processing apparatus 100B receives the new certificate via the communication unit 101B (step S309). The certificate management unit 102B stores the received new certificate in the storage unit 105B in order to update the certificate stored in the storage unit 105B with the new certificate (step S310).

Therefore, the information processing apparatuses 100B to 100D can update a certificate before finding that the current certificate has expired, so that the information processing apparatuses 100B to 100D can perform processing using the certificate smoothly.

Figure 4:
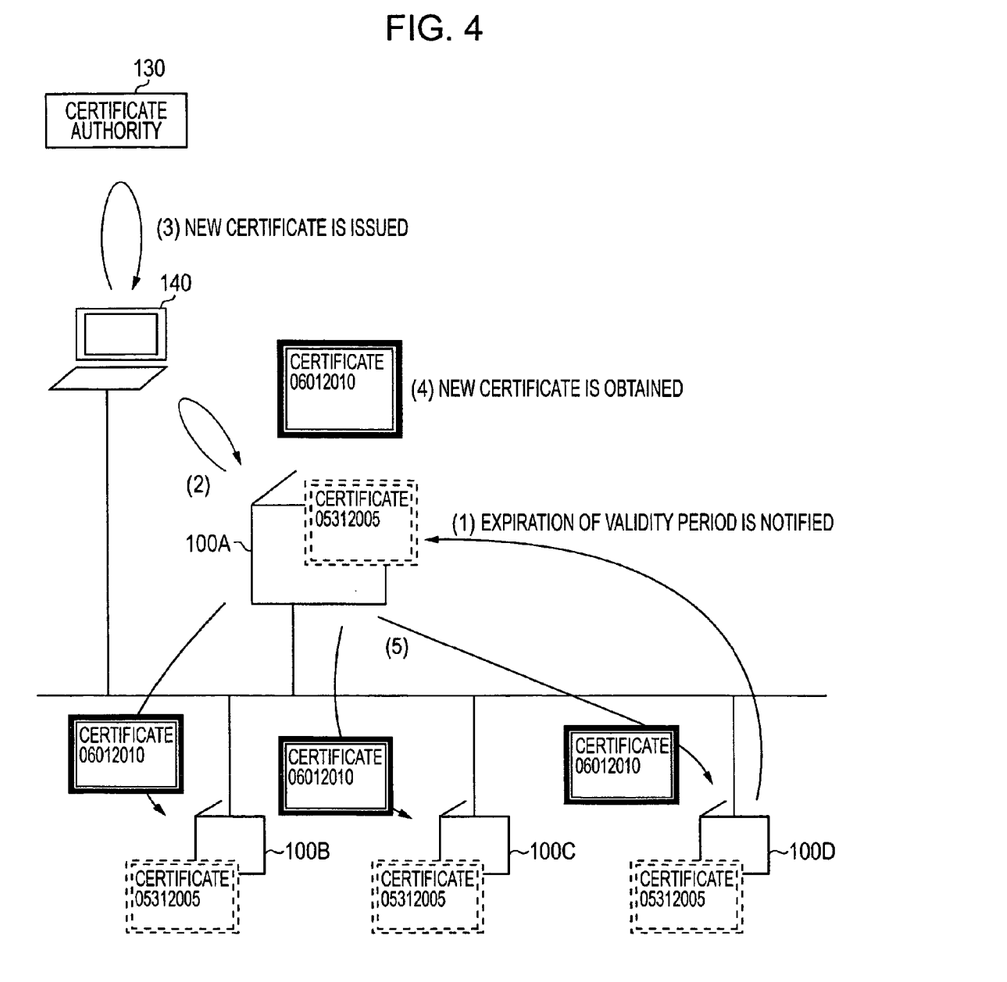
FIG. 4 illustrates an information processing process performed in a case where a second information processing apparatus finds that the expiration date of the certificate has passed before the first information processing apparatus finds it.

FIG. 4 illustrates an information processing process performed in a case where the information processing apparatus 100D finds that the expiration date of the certificate has passed before the information processing apparatus 100A finds it.

When the information processing apparatus 100D finds that a certificate held therein has expired (the expiration date: May 31, 2005), the information processing apparatus 100D notifies the information processing apparatus 100A that the expiration date of the certificate has passed ("(1)" in FIG. 4).

In response to the notification, the information processing apparatus 100A transmits a request to update the certificate to the administrator's terminal 140 ((2)).

In response to the update request, the administrator's terminal 140 applies for the issuance of a new certificate to the certificate authority 130 and obtains the new certificate from the certificate authority 130 ((3)). In this case, a process of issuing the certificate is performed over the network 120. However, the process may be carried out via the administrator's hand. In such a case, the administrator's terminal 140 displays a message to request the administrator to obtain the new certificate in response to the update request, and the administrator obtains the new certificate from the certificate authority in accordance with the message, and inputs the new certificate to the administrator's terminal 140.

When the administrator's terminal 140 transmits the new certificate to the information processing apparatus 100A, the information processing apparatus 100A obtains the new certificate from the administrator's terminal 140 ((4)). The expiration date of the new certificate is Jun. 1, 2010. The information processing apparatus 100A stores the new certificate in the storage unit 105A in order to update the expired certificate (the expiration date: May 31, 2005) with the new certificate (the expiration date: Jun. 1, 2010).

The information processing apparatus 100A then distributes the obtained new certificate to each of the information processing apparatuses 100B to 100D ((5)). The information processing apparatuses 100B to 100D store the new certificate in the respective storage units in order to update the expired certificate (the expiration date: May 31, 2005) with the new certificate (the expiration date: Jun. 1, 2010).

Figure 5:
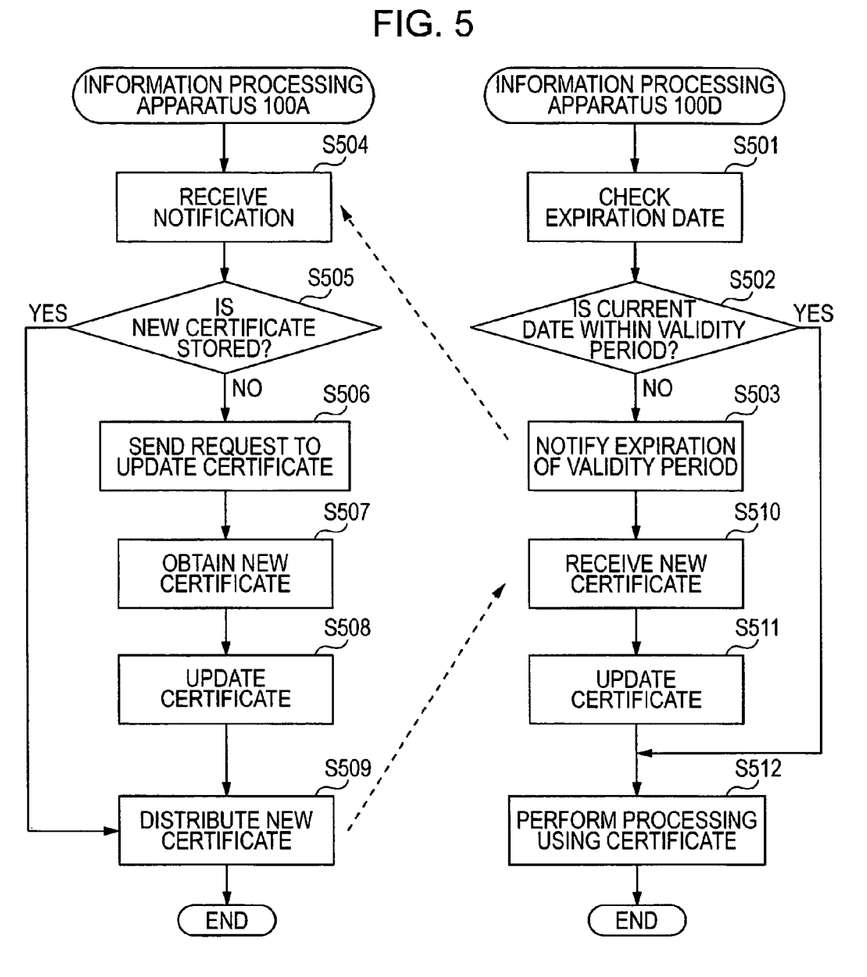
FIG. 5 is a flowchart of the information processing process performed by the information processing apparatuses shown in FIG. 4.

FIG. 5 is a flowchart of the information processing process performed by the information processing apparatuses shown in FIG. 4. The controller and the certificate management unit in each of the information processing apparatuses 100A to 100D perform the following processing in accordance with a control program based on the flowchart of FIG. 5.

When the information processing apparatus 100D tries to communicate with an external device using a certificate, the certificate management unit 102D checks the expiration date of the certificate (step S501). The certificate management unit 102D determines whether the current date is before the expiration date (whether the current date is within the validity period) (step S502). If the current date is before the expiration date (YES in step S502), the controller 109D performs processing using the certificate (step S512).

If the current date is not before the expiration date (No in step S502), the certificate management unit 102D notifies the information processing apparatus 100A via the communication unit 101D that the expiration date of the certificate has passed (step S503). At this time, the certificate management unit 102D transmits a certificate ID for identifying the expired certificate together with the notification.

Then, when the information processing apparatus 100A distributes the new certificate, the certificate management unit 102D receives the new certificate via the communication unit 101D (step S510). The certificate management unit 102D stores the received new certificate in the storage unit 105D in order to update the certificate stored in the storage unit 105D with the new certificate (step S511).

The controller 109D performs processing using the newly updated certificate (step S512).

In the information processing apparatus 100A, the following processing is performed.

When the certificate management unit 102A is notified by any one of the information processing apparatuses 100B to 100D that the expiration date of the certificate has passed, the certificate management unit 102A receives both the notification and the certificate ID (step S504).

The certificate management unit 102A determines whether a new certificate that corresponds to the received certificate ID is stored in the storage unit 105A (step S505). To determine this, the expiration date of the certificate corresponding to the certificate ID is checked. If the amount of time between the current date and the expiration date is more than a predetermined period of time, the certificate stored in the storage unit 105A is determined to be the new certificate.

If it is determined that the new certificate is stored in the storage unit 105A (YES in step S505), the certificate management unit 102A distributes the certificate stored in the storage unit 105A to each of the information processing apparatuses 100B to 100D via the communication unit 101A (step S509).

If it is determined that no new certificate is stored in the storage unit 105A (NO in step S505), the certificate management unit 102A transmits a request to update the certificate corresponding to the received certificate ID to the administrator's terminal 140 via the communication unit 101A (step S506). At this time, the update request contains a certificate ID for identifying the certificate and a certificate authority ID for identifying a certificate authority that is a publisher of the certificate. The administrator's terminal 140 or the administrator obtains a new certificate on the basis of the certificate ID and the certificate authority ID.

When the new certificate is transmitted from the administrator's terminal 140, the certificate management unit 102A obtains the new certificate (step S507). The certificate management unit 102A stores the new certificate in the storage unit 105A in order to update the expired certificate stored in the storage unit 105A with the new certificate (step S508).

The certificate management unit 102A distributes the obtained new certificate to each of the information processing apparatuses 100B to 100D via the communication unit 101A (step S509).

As described above, even in a case where any one of the information processing apparatuses 100B to 100D finds that the expiration date of the certificate has passed before the information processing apparatus 100A finds it, the certificate held in each of the information processing apparatuses 100A to 100D can be appropriately updated. In an information processing apparatus that did not find that the expiration date of the certificate had passed, the certificate can be updated with a new certificate.

In the process shown in the flowchart of FIG. 3, when the information processing apparatus 100A tries to communicate with an external device using a certificate, the certificate management unit 102A checks the expiration date of the certificate. However, the certificate management unit 102A may check the expiration date of the certificate on a regular basis. In this case, if the certificate management unit 102A determines that the expiration date has passed, steps S302 and S304 to S308 are performed.

In the process shown in the flowchart of FIG. 5, when the information processing apparatus 100D tries to communicate with an external device using a certificate, the certificate management unit 102D checks the expiration date of the certificate. However, the certificate management unit 102D may check the expiration date of the certificate on a regular basis. In this case, if the certificate management unit 102D determines that the expiration date has passed, steps S503 to S511 are performed.

Second Exemplary Embodiment

In the first exemplary embodiment, only the information processing apparatus 100A transmits a request to update the certificate to the administrator's terminal 140. However, each of the information processing apparatuses 100A to 100D may transmit a request to update the certificate to the administrator's terminal 140.

Figure 6:
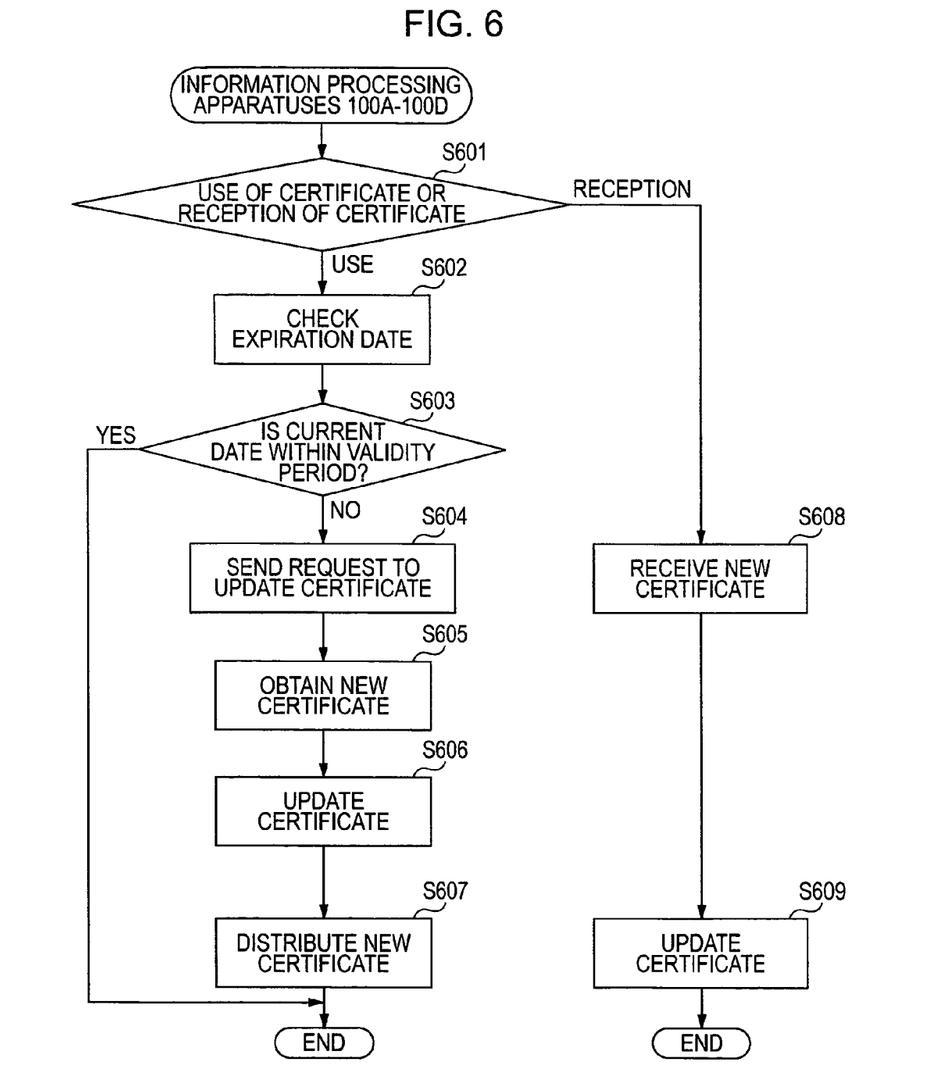
FIG. 6 is a flowchart of an information processing process performed by each of the information processing apparatuses.

FIG. 6 is a flowchart of an information processing process performed by each of the information processing apparatuses 100A to 100D. The certificate management unit in each of the information processing apparatuses 100A to 100D performs the following processing in accordance with the control program based on the flowchart of FIG. 3. The information processing process is described below by taking the information processing apparatus 100A as an example.

When the certificate management unit 102A receives a notification that the controller 109A will use a certificate or a notification that the communication unit 101A has received a new certificate, the certificate management unit 102A performs the following processing. The certificate management unit 102A first determines whether the received notification indicates that the controller 109A will use the certificate or that the communication unit 101A has received the new certificate (step S601).

If the notification indicates that the controller 109A will use the certificate (USE in step S601), the certificate management unit 102A checks the expiration date of the certificate (step S602). The certificate management unit 102A determines whether the current date is before the expiration date (whether the current date is within the validity period) (step S603). If the current date is not before the expiration date (YES in step S603), processing performed by the certificate management unit 102A ends, and the controller 109A starts processing using the certificate.

If the current date is not before the expiration date (NO in step S603), the certificate management unit 102A transmits a request to update the certificate to the administrator's terminal 140 via the communication unit 101A (step S604). The update request contains a certificate ID for identifying the certificate that the controller 109A will use and a certificate authority ID for identifying a certificate authority that is a publisher of the certificate. The administrator's terminal 140 or the administrator obtains a new certificate on the basis of the certificate ID and the certificate authority ID.

When the new certificate is transmitted from the administrator's terminal 140, the certificate management unit 102A obtains the new certificate (step S605). The certificate management unit 102A stores the new certificate in the storage unit 105A in order to update the expired certificate stored in the storage unit 105A with the new certificate (step S606). Then, the controller 109A starts the performance of processing using the new certificate, which is newly stored in the storage unit 105.

The certificate management unit 102A transmits the new certificate to each of the information processing apparatuses 100B to 100D via the communication unit 101A (step 607).

If the notification indicates that the communication unit 101A has received the new certificate (RECEPTION in step S601), the certificate management unit 102A receives the new certificate from the communication unit 101A (step S608). The certificate management unit 102A stores the received new certificate in the storage unit 105A in order to update the certificate stored in the storage unit 105A with the received new certificate (step S609).

As described above, when any one of the information processing apparatuses 100A to 100D finds the expiration date of the certificate has passed, the certificate held in other information processing apparatuses is also updated.

Third Exemplary Embodiment

In the first and second exemplary embodiments, the information processing apparatus obtains the new certificate via the administrator's terminal 140. Alternatively, the information processing apparatus can obtain the new certificate directly from the certificate authority 130.

Fourth Exemplary Embodiment

In the first to third exemplary embodiments, a program according to the present invention is stored in the ROM 107 or the storage unit 105. However, encrypting program code according to the present invention, storing the encrypted program code in storage media, such as CD-ROMs, and distributing them to users is applicable. In such a case, a user who satisfies a predetermined condition is allowed to download information regarding a decryption key from a website over the Internet and to execute the encrypted program using the information regarding the key, thereby enabling the user to install the program in a computer.

Executing program read by a computer can realize the functions of the exemplary embodiments described above. In addition, performing actual processing in part or in entirety by an operating system (OS) running on a computer in accordance with instructions of the program code can realize the functions of the exemplary embodiments described above.

According to the exemplary embodiments of the present invention, new information having a new expiration date obtained by a first information processing apparatus is transmitted to another information processing apparatus, thus allowing information having an expiration date stored in each of a plurality of information processing apparatuses to be updated with the new information having the new expiration date.

Furthermore, information indicating that the expiration date of the information has passed is notified from a first information processing apparatus to a second information processing apparatus, thus allowing the new information having the new expiration date to be obtained in response to the notification. Therefore, the information having the expiration date can be updated at an early time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-186577 filed Jun. 27, 2005, which is hereby incorporated by reference herein in its entirety.

What is claimed is:

1. An information processing apparatus comprising:
   a storing unit configured to store first information having an expiration date;
   a determining unit configured to determine that the expiration date of the first information has passed;
   a first receiving unit configured to receive information indicating that an expiration date of third information stored in another information processing apparatus has passed, from the other information processing apparatus;
   a second receiving unit configured to receive second information having an expiration date from an external device in a case where the determining unit determines that the expiration date of the first information has passed, and to receive the second information having the expiration date from the external device in a case where the first receiving unit receives the information indicating that the expiration date of the third information has passed;
   an updating unit configured to update the first information stored in the storing unit with the second information received by the second receiving unit; and
   a transmitting unit configured to transmit the second information received by the second receiving unit to the other information processing apparatus, to enable the other information processing apparatus to update the third information, which is stored in the other information processing apparatus, with the second information.

2. The information processing apparatus according to claim 1, wherein the first receiving unit is configured to receive identification information identifying the third information, and
   wherein the receiving unit is configured to receive the second information, the second information being identified on the basis of the identification information received by the first receiving unit.

3. The information processing apparatus according to claim 1, wherein the first, second and third information is an electronic certificate.

4. The information processing apparatus according to claim 1, further comprising:
   a requesting unit configured to transmit a request for the second information to the external apparatus in a case where the determining unit determines that the expiration date of the first information has passed, and to transmit the request for the second information to the external apparatus in a case where the first receiving unit receives the information indicating that the expiration date of the third information has passed.

5. The information processing apparatus according to claim 4, wherein the requesting unit is configured to request the second information by transmitting identification information identifying the first information or the third information and identification information identifying a publisher of the second information to the external device, and wherein the second receiving unit is configured to receive the second information identified on the basis of the identification information from the external device.

6. The information processing apparatus according to claim 1, further comprising:
   an address information storage unit configured to store address information corresponding to the other information processing apparatus,
   wherein the transmitting unit is configured to transmit the second information to the other information processing apparatus based on the address information.

7. The information processing apparatus according to claim 1, wherein the transmitting unit is configured to transmit, in a case where the determining unit determines that the expiration date of the first information has passed, the second information to the other information processing apparatus when a specific time has come, and transmit, in a case where the first receiving unit receives the information indicating that the expiration date of the third information has passed, the second information to the other information processing apparatus when the information indicating that the expiration date of the third information has passed is received.

8. The information processing apparatus according to claim 1, wherein the determining unit is configured to determine whether the expiration date of the first information has passed when the first information is used.

9. An information processing method for updating first information having an expiration date in a plurality of information processing apparatuses including first and second information processing apparatuses, the method comprising the following steps:

a determining step of, in the first information processing apparatus, determining that the expiration date of the first information stored in the first information processing apparatus has passed;

a notifying step of notifying information indicating that the expiration date of the first information stored in the second information processing apparatus has passed, from the second information processing apparatus to the first information processing apparatus;

a first receiving step of, in the first information processing apparatus, receiving second information having an expiration date from an external device in a case where it is determined that the expiration date of the first information stored in the first information processing apparatus has passed;

a second receiving step of, in the first information processing apparatus, receiving the second information from the external device in a case where the information indicating that the expiration date of the first information stored in the second information processing apparatus has passed is notified;

a first updating step of, in the first information processing apparatus, updating the first information stored in the first information processing apparatus with the second information received in the first or second receiving step; and a transmitting step of transmitting the second information received in the first or second receiving step from the first information processing apparatus to the second information processing apparatus; and a second updating step of, in the second information processing apparatus, updating the first information stored in the first information processing apparatus with the second information transmitted in the transmitting step.

10. The information processing method according to claim 9, wherein, in the notifying step, the second information processing apparatus notifies the first information processing apparatus of identification information identifying the first information stored in the second information processing apparatus, and wherein in the receiving step, the first information processing apparatus receives the second information, the second information being identified on the basis of the identification information notified in the notifying step.

11. The information processing method according to claim 9, wherein the first and second information is an electronic certificate.

12. The information processing method according to claim 9, further comprising:

a requesting step of, in the first information processing apparatus, requesting the second information to the external apparatus in a case where it is determined that the expiration date of the first information stored in the first information processing apparatus has passed, and requesting the second information to the external apparatus in a case where the information indicating that the expiration date of the first information stored in the second information processing apparatus has passed is notified.

13. The information processing method according to claim 12, wherein, in the requesting step, the first information processing apparatus requests the second information by transmitting identification information identifying the first information and identification information identifying a publisher of the second information to the external device, and wherein, in the receiving step, the first information processing apparatus receives the second information identified on the basis of the identification information from the external device.

14. A non-transitory computer readable storage medium storing a control program for controlling an information processing apparatus including a storing unit configured to store first information having an expiration date, the control program allowing the information processing apparatus to execute the following steps:

a determining step of determining that the expiration date of the first information stored in the storing unit has passed;

a first receiving step of receiving information indicating that an expiration date of third information stored in another information processing apparatus has passed, from the other information processing apparatus;

a second receiving step of receiving second information having an expiration date from an external device in a case where it is determined that the expiration date of the first information has passed;

a third receiving step of receiving the second information from the external device in a case where the information indicating that the expiration date of the third information has passed is received;

an updating step of updating the first information stored in the storing unit with the second information received in the second receiving step; and a transmitting step of transmitting the second information received in the second or third receiving step to the other information processing apparatus, to enable the other information processing apparatus to update the third information, which is stored in the other information processing apparatus with the second information.

* * * * *